Oct. 26, 1926.
W. A. SCHMIDT
1,604,424
PROCESS FOR REFINING PETROLEUM AND OTHER MATERIALS
Filed July 19, 1920
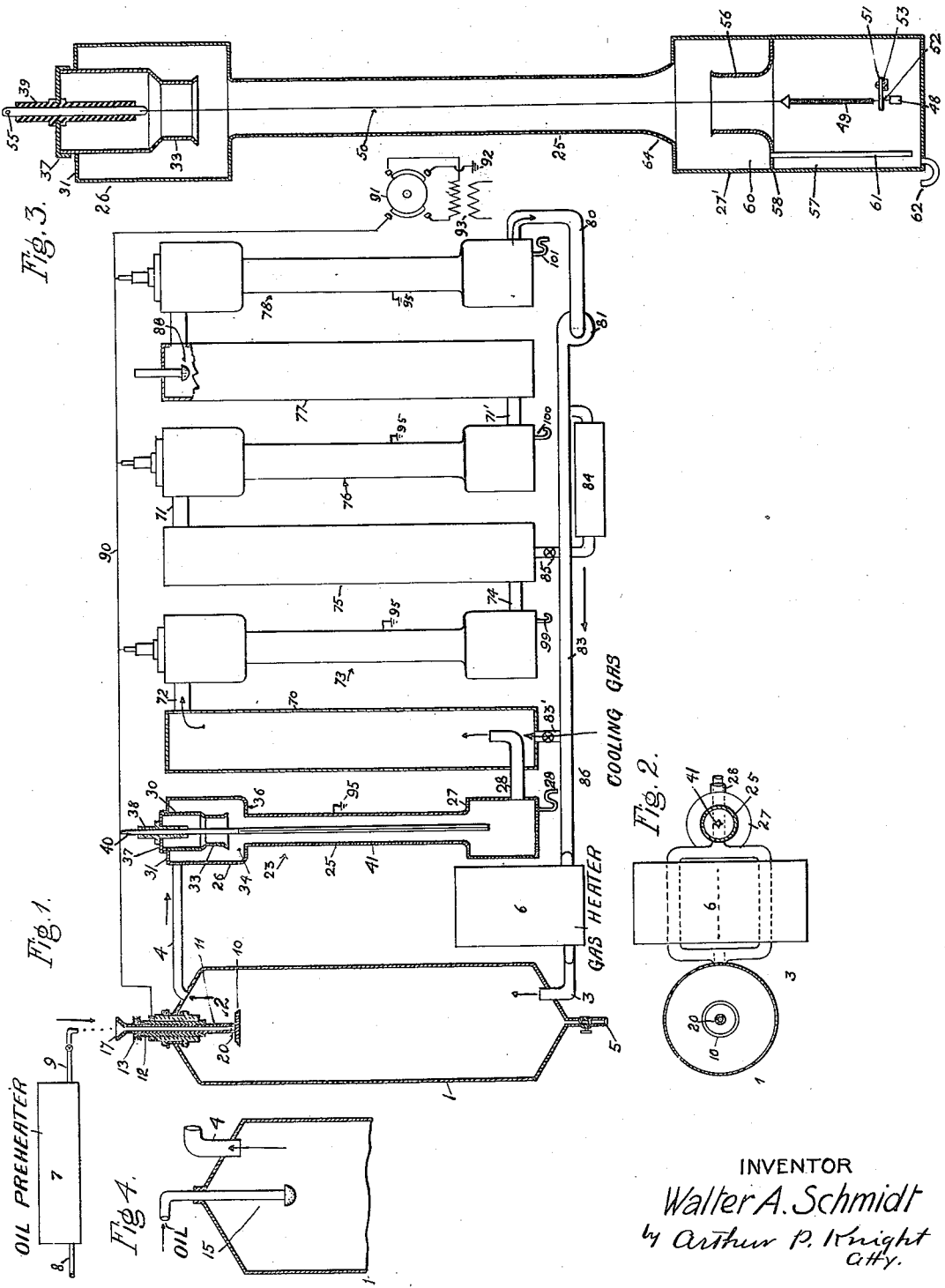
INVENTOR
Walter A. Schmidt
by Arthur P. Knight
Atty.

Patented Oct. 26, 1926.

1,604,424

UNITED STATES PATENT OFFICE.

WALTER A. SCHMIDT, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

PROCESS FOR REFINING PETROLEUM AND OTHER MATERIALS.

Application filed July 19, 1920. Serial No. 397,388.

This invention relates to the recovery of valuable products from carbonaceous materials and particularly to the art of refining crude petroleum or petroleum products or like materials, with a view to obtaining from such petroleum or other materials, one or more distillation products such as gasoline, kerosene, lubricating oils, etc., and also obtaining one or more residual products. The distillation of crude petroleum or other hydrocarbons for the purposes stated is largely carried out in large stills, and the body of the oil contained in such stills is so large that in order to secure an economic and effective rate of distillation, it is necessary to apply intense heat to the bottom or other portions of the still, to which the heat is applied, with the result that there is, in general, considerable overheating of the parts of the oil adjacent to such heated portions of the still. This results in cracking or decomposition of portions of the hydrocarbons producing some products which are relatively lighter and of lower boiling point, and other products which are relatively heavier and of higher boiling point, and as this action takes place in only a portion of the oil, there is a great lack of uniformity in the product. Moreover, these products of cracking or decomposition are in some cases objectionable or undesirable, requiring considerable effort and expense in treating the distillation products to remove such undesirable constituents.

The main object of the present invention is to provide for carrying out the distillation process in such manner that uniform heating action will be secured on the petroleum or other material being distilled. Another important object of the invention is to provide for rapid and effective distillation at comparatively low temperature. Another object of the invention is to provide for a more definite and complete separation of the several distillation constituents than has heretofore been practicable.

My present process consists essentially in distributing the petroleum or similar material in a carrying gas or gases, sufficient heat being supplied either to the petroleum or to the gas, or both, to cause rapid volatilization of the petroleum, or of a considerable proportion thereof, the resulting gases or vapors being subjected to condensing action to cause condensation and separation of the readily condensable constituents. My invention further comprises precipitation of any suspended material from the gases or vapors before they are subjected to such condensing action. My invention also comprises subjecting the gases or vapors, preferably after removal of such suspended material therefrom, to one or more cooling actions in such manner as to produce a fog or cloud of suspended particles constituting the materials to be recovered or separated, and precipitating such fog or cloud of suspended particles, preferably by electrical action.

The accompanying drawings illustrate apparatus suitable for carrying out my invention, and referring thereto,—

Fig. 1 is a partly sectional side elevation of such apparatus.

Fig. 2 is a plan view of a portion thereof.

Fig. 3 is a vertical section of a form of precipitator suitable for use in the process.

Fig. 4 is a vertical section of a modification of the spraying and evaporating means.

The apparatus shown in the drawings, comprises a chamber or receptacle 1 provided with means 2 for distributing or spraying petroleum into a carrying gas in said chamber and with an inlet pipe 3 and outlet pipe 4 for conducting the carrying gases through said chamber. Said chamber 1 may also be provided with a draining outlet 5 for conducting away unvolatilized portions of the petroleum. Heating means indicated at 6 is preferably provided for heating the incoming gases to a suitable temperature, said heating means being, for example, of the duplex checker work type. Means are also preferably provided for heating the oil or petroleum, said means, indicated at 7, being adapted to heat the petroleum coming from a supply line 8, and to deliver the heated petroleum to an outlet pipe 9 which discharges into the oil spraying means 2. Said oil spraying means may be of any usual or suitable type adapted to atomize liquid and distribute it into a body of gas. The type shown in the drawing comprises a disc 10 carried by a hollow shaft 11, which is mounted to turn in an insulated bearing 12 and is rotated by suitable means such as a pulley 13 thereon driven by belt connection from a suitable driving means. Said shaft 11 may be provided with a cup 17 to receive the oil dripping from the pipe 9. The insulation indicated at 14 for the shaft 12 should be of such nature as to withstand a comparatively high tension,—say 10,000 volts or over, and connection is made to the shaft as hereinafter described so as to maintain the high potential difference between the shaft and the enclosing walls of chamber 1, whereby a strong electrostatic field is produced at the edge or rim of the disc 10, the edge of said disc being preferably beveled or sharpened so as to increase the strength of the field and facilitate the discharge of electricity and also the discharge of oil therefrom. In the rapid rotation of shaft 11 produced by its operating means, the oil fed through the hollow shaft 11, runs out through openings 20 in said shaft and onto the disc 10, the centrifugal action causing the oil to spread out over the disc and to be supplied uniformly at the rim of the disc and the electric field at the edge of the disc causes the oil to be discharged from the disc by electrical action. By this means, atomization and distribution of the oil is effected into the body of gas without the necessity of rotating the distributing disc or spraying means 10 at excessively high velocities such as are required for direct mechanical distribution and atomization by rotary spraying means. Electrical action may, however, be dispensed with, the spraying disc being rotated at sufficient velocity to cause the oil to be discharged peripherally therefrom, or I may use an ordinary spraying nozzle as shown at 15 in Fig. 4, or other mechanical spraying means.

The outlet pipe 4 leads from chamber 1 to a precipitator 23, preferably an electrical precipitator, for example, of the form shown in Figures 1 and 2, and comprising a vertical tube or cylindrical casing 25 having an inlet chamber 26 at its top connected to the outlet pipe 4 of chamber 1 and having an outlet chamber 27 at its lower end connected to an outlet pipe 28. Lower chamber 27 is provided with a trap or outlet means 29 for drawing off precipitated material. A cylindrical shell 30 is mounted on the top plate 31 of the upper chamber 26 and is provided with a throat or contracted portion 33, preferably of the same diameter as the tube or cylindrical casing 25 of the precipitator, said contracted portion terminating sufficiently above the upper end of the tube 25 to provide for free passage of the gas or vapor through the space indicated at 34 between said contracted portion and the bottom plate 36 of the upper chamber, which extends outward from the top of the tube 25. A plate or cap 37 extends over and rests on the shell 30 and an insulator 38 is mounted in said cap and comprises an insulating tube which extends for a considerable distance above and below the cap 37 and is preferably of silica or other material capable of withstanding high temperature without serious deterioration of its electrical resistance. A rod 40 extends through this insulator 39 and a conductor 41 constituting an extension of said rod, which may be formed integrally therewith, or separate therefrom, extends down through the contracted portion 33 of shell 30 axially in the tube 25 and into the lower chamber 27. As indicated in Fig. 2, this conductor may be provided with edges or vertical flanges so as to facilitate the discharge of electricity therefrom. In some cases, however, as when dealing with hot gases of unusually high conductivity, such edges will not be necessary and such conductor may be formed as a rod, tube or bar of cylindrical or other shape, or in some cases, a wire or wires may be used as hereinafter described. The shell 30, being between the inlet pipe 4 and the insulator 39 and the discharge electrode carried thereby, serves to prevent deposition of tarry matter or other solid or liquid material on the said insulator and electrode, from the gases coming from the inlet, and in the operation of the apparatus, the discharge electrode 41 being connected to a high tension electrical supply means, any gas or vapor that finds its way through or into the throat or contracted portion 33 of the shell is therein subjected to electrical precipitating action so that any suspended matter therein is deposited on the walls of such throat or contracted portion and the gases or vapors in contact with the insulator 39 are maintained in substantially clean condition whereby the liability of deposition of tarry or other matter on the insulator 39 is reduced to a minimum. With the form of discharge electrode shown in Fig. 1, said electrode being supported wholly at its upper end and being of sufficient rigidity to maintain its axial position within the collecting electrode or tube 25 without any support at its lower portion, the liability of injury to the insulating support for the electrode is comparatively slight, as, the insulator being at the top of the apparatus and being shielded from direct access of the incoming gases and in contact only with clean gases, it may be made to maintain its insulating quality indefinitely.

In place of the rigid electrode bar shown in Fig. 1, I may use a composite electrode with wires or strips supported at their upper ends from the central bar as shown in my Patent No. 1,204,907 dated Nov. 14, 1916, or as shown in Fig. 3, the discharge electrode may consist of a wire 50 stretched between the upper insulator 39 and the lower insulator 49, to which is connected a weight 48 for holding the wire taut. A clamp 51 may be provided for holding this wire electrode in position, said clamp being adapted to embrace a wire 52 connecting electrode 49 with weight 48 and being mounted on a cross bar or strap 53 extending across the lower chamber 27' of the precipitator. With either of the described constructions, the upper cap 37, preferably rests loosely on the shell 30 and the electrode supporting rod 40 may be provided with an eye 55, whereby the entire discharge electrode unit may be raised, the clamp 51 having been detached so that the discharge electrode and insulator therefor may be withdrawn bodily from the precipitator or treater for inspection, cleaning or repairing, as may be required.

In the form of precipitator shown in Fig. 3 the lower chamber 27' is preferably provided with a cylindrical shell 56, of substantially the same diameter as the tube 25, so as to exert a cleaning action on the gases or vapors and prevent passage of suspended matter to the space 57 around the lower insulator 49, this shell 56 extending upwardly from a horizontal partition 58 which divides the lower chamber 27' into an insulator chamber portion 57 and a drip collecting portion 60. From said drip collecting portion, a pipe 61 extends to the lower chamber portion 57 and a trap 62 leads from the lower chamber portion 57 for drawing off the contents thereof while maintaining a liquid seal therefor. The lower portion of the tube 25 is preferably swelled or enlarged as indicated at 64 so to conduct the liquid running down the wall of tube 25 outwardly so that it will fall into chamber 60 outside of shell 56.

The forms of electrical precipitator above described are of especial advantage in carrying out the process of the present invention for the reason that they safeguard the insulators for the high tension discharge electrodes so as to prevent breaking down of same, by reason of deposits of tarry or aqueous matters, such as are liable to be carried over with the vapors or gases from the vaporizing chamber. Any other suitable form of precipitator may, however, be used.

The outlet pipe 28 for precipitator 23 is connected to any suitable means for condensing and collecting the desired product or products from the vapor or gas, for example, as shown in Fig. 1, said pipe 28 may be connected to a cooler 70, wherein it is mixed or brought into contact with a cooler gas so as to form a cloud or fog of suspended particles, this cloud or fog being composed of a constituent or product of the original oil or hydrocarbon which is condensable at the temperature produced in the cooler 70. From the cooler 70, an outlet pipe 72 leads to another electrical precipitator 73 which may be similar in construction to the electrical precipitator 23. An outlet pipe 74 leads from precipitator 73 to another cooler 75 wherein the gases or vapors are further cooled, for example, by admixture with a cooling agent so as to form another fog or cloud consisting of a constituent or constituents condensable at this lower temperature, and from this cooler, the gases or vapors may pass by pipe 71 to another electrical precipitator indicated at 76 and thence, by pipe 71' through another cooler indicated at 77, and thence by pipe 79 to a precipitator 78, this successive operation of cooling to form a fog or cloud and then precipitating such fog or cloud being repeated as often as is necessary to produce the desired number of products, there being as many sets of coolers and precipitators as there are stages of operation and resultant condensed products.

From the final precipitator indicated at 78 the gases, which have therein been deprived of the desired constituents, may pass to any suitable means for utilizing same. I prefer to utilize such barren gases as a carrying means or vehicle for use in the evaporating chamber 1, said gases, after removal of the condensed products therefrom, being returned through the heater 6 to the chamber 1 for repetition of the process in cyclic manner. I also prefer to utilize such gas as the means for cooling the evaporated products to condense the same, and for this purpose, means are provided for conducting the cooled barren gases or a portion thereof, back to one or more parts of the circuit for admixture of the hotter gases coming from the vaporizer or evaporator. For this purpose, pipe 80 connected to outlet of precipitator 78 may lead to a pump 81 having its outlet pipe 83 connected by pipe 83' to the cooler 70, for example, so as to mix the cold gas from pipe 82 with the comparatively warm gases and vapors coming from precipitator 23. Another portion of the gas from pump 81 may pass through a supplementary cooler 84 to a pipe 85 leading to the cooler 75 so as to mix this still further cooled gas with the gases and vapors coming from precipitator 73. Another portion of the gases coming from the pump 81 may pass direct to pipe 86 leading to the heater 6. In any one or more of the coolers 70, etc., additional or substitute cooling means may be employed, thus the cooler 77 is shown as provided with water spraying means indicated at 88, adapted to distribute or spray water in the body of gas and vapor in this cooler and to thereby condense a constituent or constituents thereof in the form of a fog or cloud which is precipitated, together with any remaining water particles, in the last precipitator 78.

Any suitable means may be provided for maintaining a high potential difference between the electrodes of the respective precipitators, said means being preferably adapted to maintain unidirectional current through the precipitators. For this purpose, the discharge electrodes of the respective precipitators may be connected to a wire 90, leading to a rectifier 91, having connection to ground 92 and connection to the secondary winding of a step-up transformer 93, whose primary winding is connected to any suitable alternating current supply circuit. The collecting electrodes of the respective precipitators are grounded as indicated at 95. Rectifier 91 is operated in synchronism with the alternating current supplied thereto in any suitable manner so as to rectify such current and deliver to the respective precipitators unidirectional impulses of high tension current, the difference of potential between the discharge and collecting electrodes in said precipitators being, for example, from 40,000 to 100,000 volts, according to the conditions existing therein. Wire 90 may also be connected to the bearing 12 for spray shaft 11.

My process may be carried out in the above described apparatus as follows:

The oil or petroleum which is to be treated, is preferably first heated in the heater 7, and is then supplied through the distributing or spraying means to the interior of chamber 1 so as to be distributed through the body of gas therein in the form of suspended particles. The gas is supplied through the chamber 1 through pipe 3, preferably after heating in the heater 6 to the temperature required for volatilization of the desired constituents of the petroleum. The finely divided particles of petroleum being brought into contact with the heated gas from pipe 3 as it passes up through the chamber 1 are subject to evaporative action, said particles presenting an enormous surface for evaporation by reason of their extemely fine state of division with the result that all of the constituents thereof which are volatile at the temperature of the said gas are quickly evaporated and mixed with the gas to form vapors which pass off with the gas through the outer pipe. In some cases the heating effect so produced on the gas will only be sufficient to drive off or volatilize constituents actually existing in the petroleum, without any cracking or decomposition thereof. In other cases I may provide for pre-heating the gas in the heater 6; or the petroleum in the heater 7 in such manner that more or less cracking is produced, any vapors or gases resulting from such cracking being carried off with the "carrying gases" through the pipe 4. In distributing the petroleum into the body of gas into chamber 1, I may use the combined electric and rotary spray device shown in Fig. 1 or the simple spraying means shown in Fig. 4, in which the oil is delivered through a fixed spray device or nozzle 15 in chamber 1 and in some cases I prefer to heat the petroleum to such a temperature in the heater 7 that when it is released at such nozzle in the chamber 1, a part of the liquid will expand instantly to state of vapor by reason of the contained heat, thereby increasing the atomization and volatilization of the petroleum. In such case the petroleum will be forced into the heater 7 under pressure, and such heater will be maintained under pressure sufficient to hold the petroleum in liquid form until it is released in the chamber 1.

The gas or gases passing through the outlet pipe 4, contain the desired constituents for the petroleum in the form of vapor and they will also contain in general more or less suspended matter, for example, tarry materials and other dark colored impurities which it is desirable to remove from the oils which are to be recovered. Such removal is effected in the first precipitator 23, wherein the gases are subjected to electrical action in the high tension electrical field between the discharge electrode and collecting electrode therein, with the result that the suspended material is deposited on such electrodes and is removed therefrom in any suitable manner, for example, by running down into the bottom chamber 27, wherefrom it is withdrawn through the trap 29, and conducted to any suitable storage means. The clean gases and vapors passing through the outer pipe 28 of the first precipitator are subjected to cooling action in cooler 70, for example, by drawing cold gas through pipe 83' into said chamber 70 so as to mix said cold gas with warm gases and vapors coming from the first precipitator and thereby causes the formation of a fog or cloud of the suspended particles, consisting of the heavier or more condensable constituents of the hydrocarbon vapors, the resulting fog or cloud being carried over with the gas though pipe 72 to the next precipitator 73 wherein the said fog or cloud is precipitated by the action of an electrical field therein and the condensed liquid which thereby caused to collect in said precipitator is drawn off through trap or pipe 99. This operation of cooling to form a fog or cloud, followed by the precipitation of such fog or cloud and recovery of a condensate, may be repeated any desired number of times, or in any number of stages, so as to give any desired number of condensates of successively lower condensing points, the temperature in the successive coolers being made lower by a supply of suitable cooling medium thereto, either by a gas cooled to the desired amount as in the case of the cooler 75, or by spraying of water, or of liquid, into the cooler as in case of the cooler 77, and the resultant condensates are drawn off through the pipes 100 and 101.

By the term "distilling", used in the claims, is meant either ordinary distillation or destructive distillation (cracking).

What I claim is:

1. The process of distilling oil which consists in spraying liquid oil in finely divided condition into contact with a current of in-condensable gas at such temperature as to cause volatilization of constituents of the oil, then cooling the gas by introduction of a gaseous cooling agent thereinto in such manner as to form a fog or cloud of condensed hydrocarbon vapor, and then precipitating such fog or cloud particles.

2. A process as set forth in claim 1 in which said cooling agent consists of gas which has passed through the process and had suspended material removed therefrom and has been cooled, said gas being introduced into the gases carrying the volatilized constituents of the oil.

3. The process of distilling oil which consists in spraying oil in finely divided condition into contact with a current of hot in-condensable gases to cause constituents of the oil to be vaporized and carried off with such current of gases, precipitating suspended material containing unvolatilized residuum from such current of gases and vapors, introducing into the current of hot gases and vapors a cooler gas to form a fog or cloud of condensed hydrocarbon vapor, and then precipitating such fog or cloud particles.

4. The process of distilling oil which consists in distributing liquid oil in finely divided condition into contact with a current of hot gases to cause constituents of the oil to be vaporized and carried off with such current of gases, then cooling the gas in such manner as to form a fog or cloud of condensed hydrocarbon vapor, then subjecting the gas with the suspended fog or cloud to electrical precipitation to precipitate such condensed material.

5. The process of distilling oil which consists in distributing liquid oil in finely divided condition into contact with a current of hot gases to cause constituents of the oil to be vaporized and carried off with such current of gases, precipitating suspended material from such current, then cooling the gas in such manner as to form a fog or cloud of condensed hydrocarbon vapor, then subjecting the gas with the suspended fog or cloud to electrical precipitation to precipitate such condensed material.

6. The process of distilling oil which consists in distributing liquid oil in finely divided condition into contact with a current of hot gases to cause constituents of the oil to be vaporized and carried off with such current of gas, precipitating suspended material from such current, then subjecting the gases to cooling and separating operations in a plurality of stages in each of which the gas is cooled in such manner as to form a fog or cloud, and the gas with the suspended fog or cloud is subjected to electrical precipitation to precipitate the suspended material.

In testimony whereof I have hereunto subscribed my name this 3rd day of July, 1920.

WALTER A. SCHMIDT.